United States Patent [19]

Konrad et al.

[11] Patent Number: 5,350,985
[45] Date of Patent: Sep. 27, 1994

[54] ELECTRIC BRAKING FOR VEHICLES WITH TWO PARALLEL ELECTRIC MOTORS

[75] Inventors: Harald Konrad, Hausen; Siegfried Puschel, Aschaffenburg; Gerald Stein, Hosbach, all of Fed. Rep. of Germany

[73] Assignee: Linde Aktiengesellschaft, Wiesbaden, Fed. Rep. of Germany

[21] Appl. No.: 980,536

[22] Filed: Nov. 23, 1992

[30] Foreign Application Priority Data

Nov. 30, 1991 [DE] Fed. Rep. of Germany ....... 4139569

[51] Int. Cl.⁵ ............................. B60L 7/22; H02P 3/08
[52] U.S. Cl. .................... 318/370; 318/375; 318/376
[58] Field of Search ................... 318/35-89, 318/112, 370-376, 527

[56] References Cited

U.S. PATENT DOCUMENTS

| | | | |
|---|---|---|---|
| Re. 32,543 | 11/1987 | Williamson | 318/376 |
| 3,798,520 | 3/1974 | Friend et al. | 318/55 |
| 3,953,775 | 4/1976 | Friend et al. | 318/147 |
| 4,092,577 | 5/1978 | Markham | 318/370 |
| 4,093,900 | 6/1978 | Plunkett | 318/370 |
| 4,173,732 | 11/1979 | Anderson | 318/375 |
| 4,355,267 | 10/1982 | Franz, Jr. et al. | 318/89 |
| 4,384,240 | 5/1983 | Sloan | 318/255 |
| 4,393,338 | 7/1983 | Jones et al. | 318/86 |
| 4,422,022 | 12/1983 | Hill et al. | 318/376 |
| 4,423,363 | 12/1983 | Clark et al. | 318/375 |
| 4,471,277 | 9/1984 | Franz, Jr. | 318/376 |
| 4,479,080 | 10/1984 | Lambert | 318/373 |
| 4,489,257 | 12/1984 | Lindow | 318/258 |
| 4,712,054 | 12/1987 | Boldt | 318/758 |
| 4,730,151 | 3/1988 | Florey et al. | 318/376 |
| 4,749,933 | 6/1988 | ben-Aaron | 318/810 |
| 5,148,883 | 9/1992 | Tanaka et al. | 318/376 X |
| 5,172,038 | 12/1992 | Page et al. | 318/373 |

FOREIGN PATENT DOCUMENTS

| | | |
|---|---|---|
| 0114285 | 12/1983 | European Pat. Off. |
| 1015770 | 1/1966 | France . |
| 1585577 | 3/1981 | France . |

*Primary Examiner*—Paul Ip
*Attorney, Agent, or Firm*—Thomas R. Shaffer

[57] ABSTRACT

For the low-loss braking of an electrically driven vehicle with two electric motors connected in parallel and arranged one on each side of the vehicle and which are controlled by a pulse control, it is proposed, for one, to brake the vehicle above a prescribed rpm threshold value by useful-current braking, and below it by means of regenerative braking. Secondly, instead of an rpm threshold value, the battery current can also be used as the criterion for one of the two different braking types. A high heat generation in the motors is avoided and energy is saved by this braking process. An electric switching circuit for the conversion of this process is indicated.

11 Claims, 1 Drawing Sheet

ELECTRIC BRAKING FOR VEHICLES WITH TWO PARALLEL ELECTRIC MOTORS

BACKGROUND OF THE INVENTION

1. Field of the Invention

The invention concerns a process for the low-loss braking of an electrically driven vehicle with two electric motors connected in parallel and located one on each side of the vehicle, and which are controlled by pulse control.

2. Description of the Prior Art

Vehicles with drives of the said type have been braked by dynamic (or plug) braking up to now. The braking process is unleashed by the operator, e.g., by actuating the counterpedal in the case of two-pedal control, and by switching over the travel direction with a hand switch in the case of one-pedal control. Braking then occurs proportionally to the pedal position.

To produce a braking torque, a pole change is effected in the field exciting the electric motor by means of electric switchings or the direction of current through the electric motor is reversed.

In the case of dynamic braking, the two parallel-connected electric motors are switched over electrically in the opposite direction of rotation, while those of the wheels of the vehicle are still driven in the original direction of rotation. The armatures of the two motors are short-circuited by means of armature diodes and the energizing field is excited by current pulses by means of pulse control in order to generate a sufficiently high braking torque. The short-circuit current over the armature diode causes Joule losses at the internal resistance of each armature. Because the current strengths arising during the braking process are high in comparison with other driving modes and flow through the armature of each motor within a few seconds, a high heat generation occurs there due to Joule losses, which sharply reduces the service life of the electric motors.

The purpose of the present invention is thus to develop a braking process for vehicles with drives of the type described above, in which the Joule losses occurring and the associated disadvantages are minimized, and to provide a suitable arrangement for it.

SUMMARY OF THE INVENTION

This goal is achieved according to the invention in that the vehicle is braked by braking circuit means by regenerative braking above a prescribed threshold value for the rpm of the electric motors, and by dynamic braking below this threshold value.

Above a prescribed threshold value for the rpm's detected by a tachometer, each of the two electric motors is braked by regenerative braking in unleashing the braking process of each of the two electric motors. In this type of braking a portion of the kinetic rotation energy of the motor is converted into electrical energy, which is returned to the voltage source (battery) in the form of a braking current.

Regenerative braking is effective only so long as sufficient kinetic energy is available for conversion to electrical energy, i.e., so long as the rpm's of the electric motors do not drop below a certain value. A brake torque is no longer produced when the motor speed is too low.

Below a prescribed threshold value for the rpm, there is thus an automatic switching of the braking circuit means to dynamic braking according to the invention, by which the vehicle can finally be brought to a stop.

Two embodiments are conceivable here, namely that first the vehicle is accelerated into the opposite direction so long as the corresponding travel direction inducers (pedal or hand switch) are actuated, or that the two motors are rendered currentless after the braking, so that a stoppage of the vehicle occurs. In the latter embodiment the motors would be rendered currentless by opening the corresponding travel direction contacts when the rpm's of the motors are rendered currentless in passing through zero.

It is advantageous here if after the braking process and with a driving torque operating externally the vehicle is kept stopped by a corresponding load moment of the electric motors.

A corresponding regulation serves to compensate for a deviation in the rpm from the zero point in both directions (ascending or descending). The vehicle can thus be held in the stopped position on an inclined plane also.

Besides the running detection of the characteristic values essential to the operating state, it is advantageous according to the invention to detect the values determining the braking process continuously also and connect them logically.

The results of such a logical connection can serve to convert the invention process technically in a simple manner.

The rpm's of the two electric motors and the settings of the travel direction inducers are advantageously used as the values determining the braking process.

A logical connection specification is described in the following for the two-pedal control; there is an analogous one for the one-pedal control with hand switch.

According to the invention, the signal furnished by the tachometer is converted by means of a threshold value switch into a binary signal. The logical "1" stands for rpm's above the threshold value for the rpm prescribed according to the invention, the logical "0" for the rpm's below it. The absolute rpm value is used here, i.e., the analogous is true for both travel directions.

In addition, the two signals of the travel direction pickup are converted into a binary signal. The logical "1" stands for an actuated pedal here, the logical "0" of a nonactuated pedal.

According to the invention, the three binary signals resulting from this are fed to a logical connection circuit, whose output again furnishes a binary signal. For example, in the case of braking a logical "0" of this output signal stands for regenerative braking, while a logical "1" stands for dynamic braking. During travel the output signal furnishes a logical "1", when stopped, a logical "0".

The goal initially posed according to the invention is attained by a process in which the vehicle is braked by regenerative braking or dynamic braking or by regenerative braking as a function of the battery current.

Instead of detecting the rpm's of the two electric motors, only measurement of the battery current by means of a current pickup is necessary for the braking process in this case, a pickup that continuously detects the level and direction of the battery current.

During travel as well as in regenerative braking, current is delivered by the battery temporarily in the positive sense, in which case the battery current is temporarily very low during dynamic braking. During regenerative braking, a battery current flow into the battery occurs in the negative sense during feedback of the battery current.

The differing behavior of the battery current in the travel and braking situations thus permits a braking of the vehicle as a function of this battery current.

In this method for low-loss braking a tachometer can drop out completely, but at least the establishment of an rpm threshold value for braking the vehicle can be dispensed with.

If the rpm threshold value for the braking process according to the above invention process is not selected sufficiently precisely, a premature switchover from regenerative to dynamic braking can occur although sufficient braking current is still available for feedback into the battery, or a belated switchover, whereby an excessively small braking moment is available at the end of the regenerative braking phase. Such a deficient switchover from regenerative to dynamic braking can be manifested by a jerky braking action.

It is advantageous for the second invention process if the vehicle is braked above a prescribed threshold value for the battery current by regenerative braking, below this threshold value by dynamic braking.

The current delivered by the battery when operating the vehicle in the positive sense is detected by a current pickup and compared in a suitable circuit with a prescribed threshold value.

A regenerative braking is no longer effective below this threshold value because the vehicle is travelling too slow to generate a sufficiently high braking torque with regenerative braking. In this case, there is an immediate switching to dynamic braking when the braking process is unleashed.

It is also important if there is a switching to dynamic braking during regenerative braking when the battery current fed back into the battery falls below a prescribed threshold value. For this, the battery current detected by the current pickup, which is introduced into the battery in the negative sense during regenerative braking, is compared with a second prescribed threshold value.

If the braking current fed back into the battery falls below this prescribed threshold value, in which case absolute values are compared with each other, an excessively small braking moment is produced by the regenerative braking, so that there is a switchover to dynamic braking according to the invention for an effective braking of the vehicle.

Additional embodiments of this invention process, analogous to the invention process depicted first, are possible.

In particular, a logical connection of the various binary signals is also offered, where the results of this logical connection determine regenerative or dynamic braking.

For example, the signal furnished by the current pickup for the battery current can be converted by two threshold value switches into binary signals. Depending on whether the battery current is directed in the positive or negative sense, the absolute values of the battery current are compared with a prescribed threshold value. The logical "1" an stand for battery currents above this threshold value, the logical "0" for battery currents below this value.

In addition, the two signals of the travel direction inducer are again converted into a binary signal. For example, the logical "1" stands for an actuated pedal of a travel direction inducer, the logical "0" for a nonactuated pedal.

If the backward pedal is actuated during straight travel in the forward direction to induce the braking process and the battery current flowing in the positive sense exceeds the prescribed threshold value, three binary signals are produced, namely, a logical "1" of the battery current, a logical "0" for the forward pedal and a "1" for the backward pedal.

These three binary signals are fed to a logical operation circuit, the output of which in this case delivers a logical "0", when then must stand for regenerative braking.

During the regenerative braking the binary signal is fed to the logical operation circuit; it is delivered from the second threshold value switch, which compares the absolute value of the battery current directed in the negative sense (=braking current fed back into the battery) with a prescribed threshold value. If this binary signal is changed form "1" to "0", the output of the logical operation circuit changes from "0" to "1" and the dynamic braking is thereby unleashed.

The output signal of this logical operation circuit can be fed to a device for carrying out the said two invention processes, where this device is characterized in that the two electric motors are connected by a first electrical contact at their one armature side lying toward the energizing field, and that a second electrical contact is installed in one of the current feed leads to the two electric motors, which is in active connection with the first contact.

The working connection of these two contacts is such that one contact opens when the other closes.

The use of the first electrical contact that connects an armature side of the two electric motors has already been proposed in the DE-OS 21 39 571. This contact handles compensation for the voltage differences between the two armature sides of the motors. Such voltage differences that occur, e.g., during dynamic braking can lead to the blockade of a motor if circular currents arise between the two motors and one motor thus drives the other one as a generator.

Furthermore, such a contact increases the stability of the vehicle in negotiating a curve. Compensation currents can result in an increase in the current strength in the armature of the motor on the inside of the curve, whose rpm is thus reduced more sharply than induced by the usual control and regulation process.

Besides, the motor on the inside of the curve can be rendered completely currentless in the case of a prescribed steering deflection. For this, the corresponding travel direction contactors and the first electrical contact are opened. A reaction of the motor on the curve outside on the parallel motor on the curve inside is then excluded when the first contact is open.

It can also be advantageous if an electrical resistance is connected in parallel to the first contact. With an open first contact compensation currents then flow through this resistance between the armature sides of both motors lying toward the energizing field. This leads to the advantages already described, in particular, in dynamic braking.

The invention process can be advantageously actualized if the output of a logical operation circuit whose input can be acted upon with measurement data of the values determining the braking process is in active connection with the first electrical contact.

Measurement data that characterize the braking process (i.e. the positions of the travel inducers and either the rpm of both motors or the battery current) and present at the input of the operation circuit can thus induce the opening and closing of the first electrical contact, by which the behavior of the second electrical contact is again indicated. For example, a logical operation specification as already described above is suitable here. The binary output of the operation circuit then determines the positions of the two electrical contacts, which again facilitate the transition from regenerative to dynamic braking.

DETAILED DESCRIPTION OF THE PREFERRED EMBODIMENT

Figure 1:
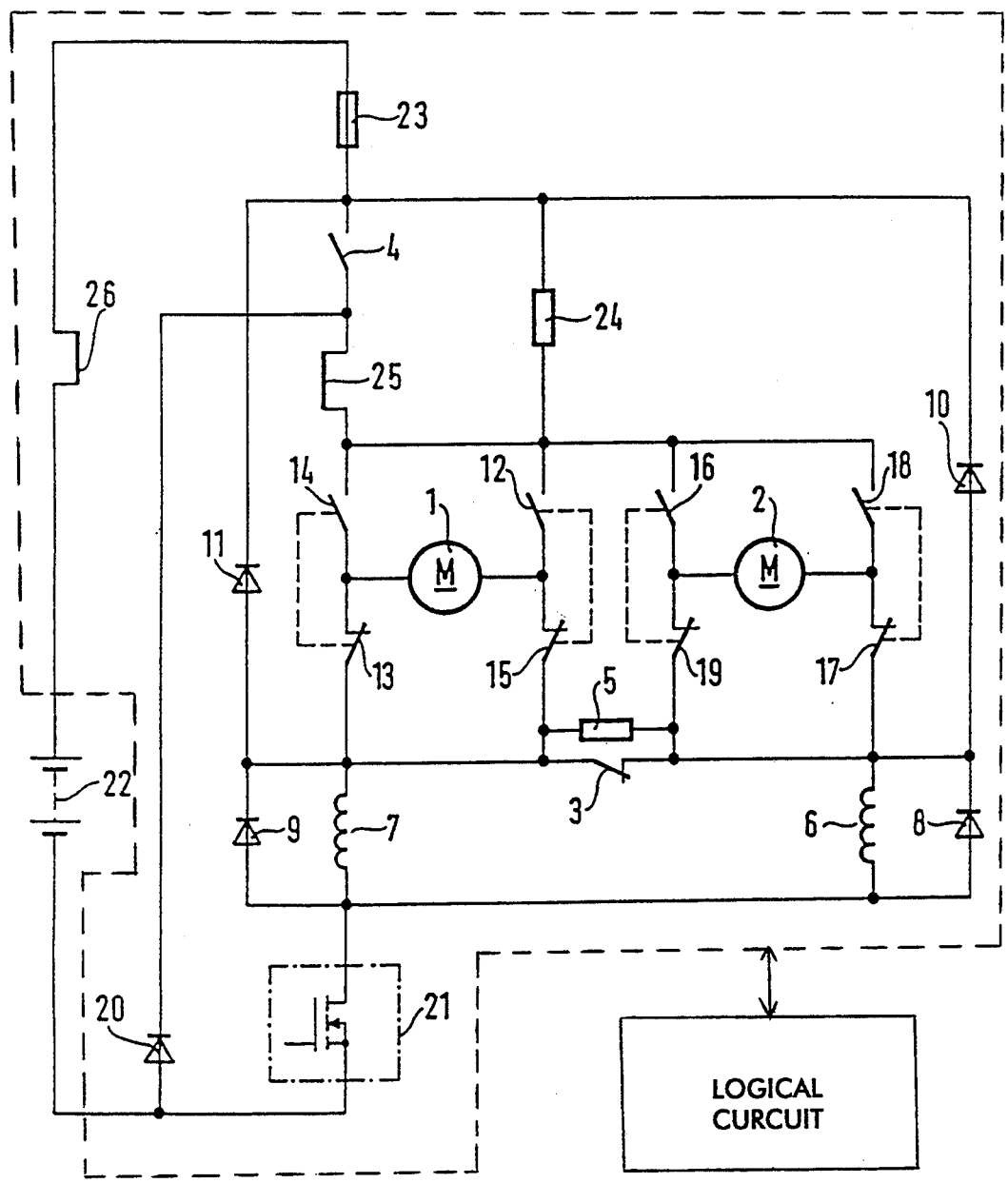
FIG. 1 is a schematic drawing showing the invention process and pertinent apparatus.

An exemplary embodiment of the invention process and the pertinent apparatus are elucidated in greater detail in the following with reference to the attached schematic drawing.

A braking circuit means suitable for the low-loss braking of an electrically driven vehicle according to the invention is shown in the drawing.

The two electric motors 1 and 2 are connected in parallel through the travel direction contactors 12-19. If the contactors 14 and 15 are closed, the partners 13 and 12 are automatically opened. The analogous is true for the travel direction contactors 16-19. The electric motors 1 and 2 have armature diodes 11 and 10, a field coil 7 and 6 and a field diode 9 and 8. The first electrical contact 3 connects the armature sides of the two electric motors lying toward the energizing field. This contact 3 is in working connection with a second electrical contact 4 in one of the current supply leads to the two electric motors. If the contact 3 is closed, contact 4 automatically opens, and vice versa. An electrical resistance 5 is connected in parallel to the contact 3.

The thyristor 21 represents the d.c. chopper converter; the feedback diode 20 and the resistance 24 are required in useful-current braking. The fuse 23 protects against current peaks. The battery 22 handles the vehicle drive. The current pickup 25 measures the motor current and the current pickup 26, the battery current.

Three binary signals are fed to a logical operation circuit (not shown). Two originate from the travel direction inducers and indicate which travel direction has been activated. The third signal is obtained from a threshold value switch, which compares the signal delivered by the tachometer with a prescribed rpm threshold value when the first of the two invention processes is carried out.

For example, the contact 4 is closed during forward travel by the output signal of the logical operation circuit and thus the contact 3 is opened. The travel direction contactors 14 and 15 and 16 and 17 are closed, whereby the current flow with closed thyristor 21 occurs through the two electric motors 1 and 2. With an open thyristor 21 the current flows through the armature diodes 11 and 10 and the field diodes 9 and 8 of the two electric motors 1 and 2.

Compensation currents through the resistance 5 prevent a mutual unfavorable influencing of the two parallel electric motors.

The opposite travel direction is activated in braking. The travel direction contactors 12, 13 and 18, 19 close, by which their partners 14, 15 and 16, 17 are opened. The current direction through the two electric motors 1 and 2 is reversed. The output of the logical operation circuit, at an rpm value above the prescribed threshold value, causes the contact 4 to be opened, i.e., the contact 3 is closed. The vehicle is thus braked by regenerative braking. With a closed thyristor 21 the current now flows through the resistance 24 and through the two motors 1 and 2 and the field coils 7 and 6. In addition, a so-called braking current builds up and flows through the feedback diode 20, the two motors 1 and 2 and the field coils 7 and 6. With an identical potential of the armature sides facing the energizing field of the two electric motors 1 and 2, no current flows through the closed contact 3.

If the braking current exceeds a certain level, the thyristor 21 is opened and the braking current flows in the opposite direction through the feedback diode 20, the two motors 1 and 2, the field coils 7 and 6, the field and armature diodes 9 and 8 and 11 and 10 into the battery 22.

The rpm threshold value prescribed for the threshold value switch is 200 rpm in the exemplary embodiment. Below this value the rotation energy is no longer sufficient to produce a sufficiently strong braking current. To facilitate an effective braking, however, there is a switching to dynamic braking below this threshold value.

For this, the closing of contact 4 and the opening of contact 3 are effected from the output signal of the logical operation circuit. The vehicle contactors 12-19 remain unchanged. When the thyristor 21 is closed, a current flow is created through the field coils 7 and 6, by which the field is excited and a braking torque maintained. When the thyristor 21 is open, the flow of the field decreases due to the de-energizing and the current goes back through the armatures of the electric motors 1 and 2.

If finally an rpm going back to 0 is determined on the average by the tachometer, the travel direction contactors 12, 14, 16 and 18 and the contact 3 are opened and the vehicle comes to a stop if no driving forces act from the outside.

Analogously with the example described according to the former invention process, the vehicle can also be braked with regenerative braking or with dynamic braking, depending on the battery current. For this, the signal measured by the current pickup 26 for the battery current is fed, e.g., to two threshold value switches. In addition, the signal of the current pickup 25 can be used as the criterion for one of the two braking types. If the battery 22 delivers current to the electric motors 1 and 2, the battery current flows in the positive sense; if the current is fed back into the battery 22, it flows in the negative sense.

A switchover from braking to dynamic regenerative braking takes place if the absolute value of the battery current fed back into the battery drops below a prescribed threshold value. In this case the switchover criterion is specified by the battery current, i.e., the braking current fed back, independently of the motor speed. This braking current fed back is a direct measure of the efficiency of regenerative braking. There is a switchover to dynamic braking according to the invention, independently of the rpm, only if regenerative braking produces an excessively low braking moment.

The current strength values of up to 500 amperes, arising during the braking process conditioned only be dynamic braking and lasting about 3 seconds, are effectively reduced in the motor armatures by the invention and partially fed back to the battery by regenerative braking. The Joule heat losses in the armatures of the electric motors 1 and 2 and the power consumption are thus effectively reduced. Below the threshold values for the rpm and for the battery current fed back, an effective braking up to stoppage is possible, without excessively loading the motor thermally as before.

While certain presently preferred embodiments of the present invention have been described and illustrated, it is to be distinctly understood that the invention is not limited thereto but may be otherwise embodied and practiced within the scope of the following claims.

I claim:

1. A process for the low-loss braking of an electrically driven vehicle by providing braking circuit means wherein two electric motors are connected in parallel and assigned to each side of the vehicle and which are controlled by pulse control, comprising the steps of continuously detecting the rpm of both electric motors (1,2) and the positions of travel direction inducers and, at the moment braking of the vehicle is commenced as indicated by the positions of the travel direction inducers, utilizing said braking circuit means to brake the vehicle by regenerative braking above a prescribed threshold value for the rpm of both electric motors (1,2) and utilizing said braking circuit means to brake the vehicle by dynamic braking below said threshold value.

2. A process according to claim 1 wherein in case an externally acting drive torque continues to exist after the braking process, which drive torque is determined by detecting the rpm of both electric motors (1,2), the vehicle is kept stopped by utilizing said braking circuit means to provide a load moment in the electric motors (1,2) corresponding to said externally acting drive torque.

3. A process for the low-loss braking of a vehicle driven electrically by a battery by providing braking circuit means wherein two electric motors are connected in parallel and assigned one on each side of the vehicle, which motors are controlled by a pulse control, comprising the steps of continuously measuring the battery current and detecting the positions of travel direction inducers and, at the moment of braking of the vehicle is commenced as indicated by the positions of the travel direction inducers, utilizing said braking circuit means to brake the vehicle by regenerative braking above a prescribed threshold value for the battery current supplied by the battery (22) and utilizing said braking circuit means to brake the vehicle by dynamic braking below said threshold value for the battery current.

4. A process according to claim 3 further comprising the step of switching said braking circuit means over to dynamic braking during regenerative braking when the battery current fed back into the battery drops below a prescribed threshold value.

5. A process according to claim 3 wherein in case an externally acting drive torque continues to exist after the braking process, the vehicle is kept stopped by utilizing said braking circuit means to provide a load moment in the electric motors (1,2) corresponding to said externally acting drive torques.

6. Braking circuit means for performing the process according to claim 1 comprising two electric motors (1,2) connected at their one armature side facing an energizing field by a first electrical contact (3), comprising further detecting means for detecting the rpm of both electric motors 1,2) and the positions of travel direction inducers, further comprising a second electrical contact (4) installed in the main feed line to the two electric motors (1,2) which second electrical contact (4) is in active connection with the first contact (3) and with said detecting means.

7. Braking circuit means according to claim 6 further comprising an electrical resistance (5) connected in parallel to the first contact (3).

8. Braking circuit means according to claim 6 further comprising a logical operation circuit in the form of a binary processor, whose input can be acted upon with measurement data in form of the quantities determining the braking process, said quantities including the rpm of both electric motors (1,2) and the positions of travel direction inducers, and whose output is in active connection with the first electrical contact (3).

9. Braking circuit means for carrying out the process according to claim 3 comprising two electric motors (1,2) connected at their one armature side facing an energizing field by a first electrical contact (3), comprising further means for measuring the battery current and for detecting the positions of travel direction inducers, further comprising a second electrical contact (4) installed in the main feed line to the two electric motors (1,2) which second electrical contact (4) is in active connection with the first contact (3) and with said measuring and detecting means.

10. Braking circuit means according to claim 9 further comprising an electrical resistance (5) connected in parallel to the first contact (3).

11. Braking circuit means according to claim 9 further comprising a logical operation circuit in the form of a binary processor, whose input can be acted upon with measurement data in binary form of the quantities determining the braking process, said quantities including the battery current and the positions of travel direction inducers, and whose output is in active connection with the first electrical contact (3).

* * * * *

UNITED STATES PATENT AND TRADEMARK OFFICE
CERTIFICATE OF CORRECTION

PATENT NO. : 5,350,985
DATED : September 27, 1994
INVENTOR(S) : Harald Konrad et al.

It is certified that error appears in the above-identified patent and that said Letters Patent is hereby corrected as shown below:

Column 1, line 49, after "braked by" insert --a--.

Column 2, line 57, after "dynamic braking" delete --or by regener---.

Column 2, line 58, delete --ative braking--.

Column 6, line 56, after "from" insert --regenerative--.

Column 6, line 56, after "dynamic" delete --regenerative--.

Column 8, line 15, after "motors" insert --(--.

Column 8, line 27, after "in" insert --binary--.

Signed and Sealed this

Fourth Day of April, 1995

Attest:

BRUCE LEHMAN

Attesting Officer

Commissioner of Patents and Trademarks